(12) United States Patent
Gupta et al.

(10) Patent No.: US 10,097,998 B2
(45) Date of Patent: Oct. 9, 2018

(54) FRICTIONLESS AUTHENTICATION OVER WIFI

(71) Applicant: Verizon Patent and Licensing Inc., Arlington, VA (US)

(72) Inventors: Gaurav Gupta, Fremont, CA (US); Okeno Palmer, Oakland, CA (US); Bhawna Bhandari, Santa Clara, CA (US); Manisha Vyas, Union City, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 15/487,368

(22) Filed: Apr. 13, 2017

(65) Prior Publication Data

US 2018/0220299 A1    Aug. 2, 2018

Related U.S. Application Data

(60) Provisional application No. 62/452,955, filed on Jan. 31, 2017.

(51) Int. Cl.
| | |
|---|---|
| *H04M 1/66* | (2006.01) |
| *H04W 12/06* | (2009.01) |
| *H04W 8/18* | (2009.01) |
| *H04W 76/02* | (2009.01) |
| *H04W 8/26* | (2009.01) |
| *H04L 29/06* | (2006.01) |
| *H04W 76/10* | (2018.01) |

(52) U.S. Cl.
CPC ......... *H04W 12/06* (2013.01); *H04L 63/0884* (2013.01); *H04W 8/18* (2013.01); *H04W 8/26* (2013.01); *H04W 76/02* (2013.01); *H04W 76/10* (2018.02)

(58) Field of Classification Search
CPC ...................... H04L 2463/082; H04L 63/0884
USPC ......................................................... 455/411
See application file for complete search history.

(56) References Cited

U.S. PATENT DOCUMENTS

| | | | | |
|---|---|---|---|---|
| 2009/0217048 A1* | 8/2009 | Smith | ..................... | H04L 63/06 713/176 |
| 2013/0252583 A1* | 9/2013 | Brown | .................. | H04W 12/06 455/411 |
| 2014/0130145 A1* | 5/2014 | Yeleswarapu | ........... | H04L 61/30 726/9 |
| 2014/0157381 A1* | 6/2014 | Disraeli | .................. | G06F 21/31 726/7 |
| 2017/0374551 A1* | 12/2017 | Shen | ..................... | H04W 12/06 |

OTHER PUBLICATIONS

Android Developers, "ConnectivityManager," available at https://developer.android.com/reference/android/net/ConnectivityManager.html (visited Apr. 13, 2017).

(Continued)

*Primary Examiner* — Timothy Pham (57) ABSTRACT

A system described herein may allow for the frictionless authentication of a user and/or user device (e.g., without requiring that the user provide login details, such as a user name and password). The frictionless authentication may occur via a licensed wireless network, even when the user device is actively engaged in communications with an unlicensed wireless network (and/or is not engaged in communications with the licensed wireless network).

20 Claims, 7 Drawing Sheets

(56) References Cited

OTHER PUBLICATIONS

Android Developers, "NetworkRequest," available at https://developer.android.com/reference/android/net/NetworkRequest.html (visited Apr. 13, 2017).

Android Developers, "NetworkRequest.Builder," available at https://developer.android.com/reference/android/net/NetworkRequest.Builder.html (visited Apr. 13, 2017).

Android Developers, "NetworkCapabilities," available at https://developer.android.com/reference/android/net/NetworkCapabilities.html (visited Apr. 13, 2017).

Android Developers, "Network," available at https://developer.android.com/reference/android/net/Network.html (visited Apr. 13, 2017).

Android Developers, "ConnectivityManager.NetworkCallback," available at https://developer.android.com/reference/android/net/ConnectivityManager.NetworkCallback.html (visited Apr. 13, 2017).

* cited by examiner

FRICTIONLESS AUTHENTICATION OVER WIFI

CLAIM OF BENEFIT TO PRIOR APPLICATION

This application claims the benefit of U.S. Provisional Patent Application No. 62/452,955, titled "FRICTIONLESS AUTHENTICATION OVER WIFI," filed Jan. 31, 2017, the contents of which are incorporated herein in their entirety.

BACKGROUND

Web-based services often require authentication, which can be an inconvenient process for users. Solutions, which more conveniently log users in (e.g., without requiring that a user provide one or more credentials, such as a user name and/or password) when connected to cellular networks, may not function properly when user devices are connected to other types of networks (e.g., "WiFi" networks).

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may allow a device to be authenticated in a "frictionless" manner (e.g., with minimal or zero user interaction), using network-based authentication techniques, while the device is connected to a private and/or unlicensed network (e.g., a Local Area Networks ("LANs"), a wireless LAN ("WLANs"), etc.). The systems and/or methods described herein may work on a variety of platforms, including both platforms that provide an Application Programming Interface ("API") related to one or more operations described herein, and also platforms that do not explicitly provide an API related to one or more operations described herein.

For example, a user equipment ("UE") may be capable of communicating over multiple different types of networks, such as a licensed wireless network (e.g., a cellular network, a Long-Term Evolution ("LTE") network, and/or some other type of wireless network that operates using licensed portions of the radio frequency ("RF") spectrum) and an unlicensed wireless network (e.g., a "WiFi" network). As used herein, the term "licensed" refers to portions of the RF spectrum (e.g., frequency bands) which have been licensed, by an authoritative entity, such as a government agency, for use by a wireless network service provider. An example of a licensed wireless network may be include a cellular telecommunications network and/or a similar type of network. The term "unlicensed," on the other hand, refers to portions of the RF spectrum that have not been licensed for use by a wireless network service provider. An example of an unlicensed wireless network includes a WiFi-implemented WLAN and/or a similar type of network.

Generally speaking, when a UE is connected to a WiFi network, the UE's interface with the WiFi network is the "default" interface through which data is typically sent and/or received (e.g., by applications running on the UE). However, some techniques that require communication with a licensed wireless network, such as authentication techniques that use mobile directory number ("MDN") information and/or other proprietary information specific to the licensed wireless network, may be inoperable if the UE attempts to perform the techniques via a different network (e.g., via a WiFi network).

As described herein, a UE may communicate with components of a licensed wireless network, to perform frictionless authentication processes, even when the UE is also connected to an unlicensed wireless network. By communicating with the licensed wireless network (even when a connection with an unlicensed wireless network is active), embodiments described herein may allow a user to complete a frictionless authentication process, while still maintaining an active connection via the unlicensed wireless network, thus retaining the desirable aspects of the unlicensed network (e.g., low cost, high throughput, etc.).

Figure 1:
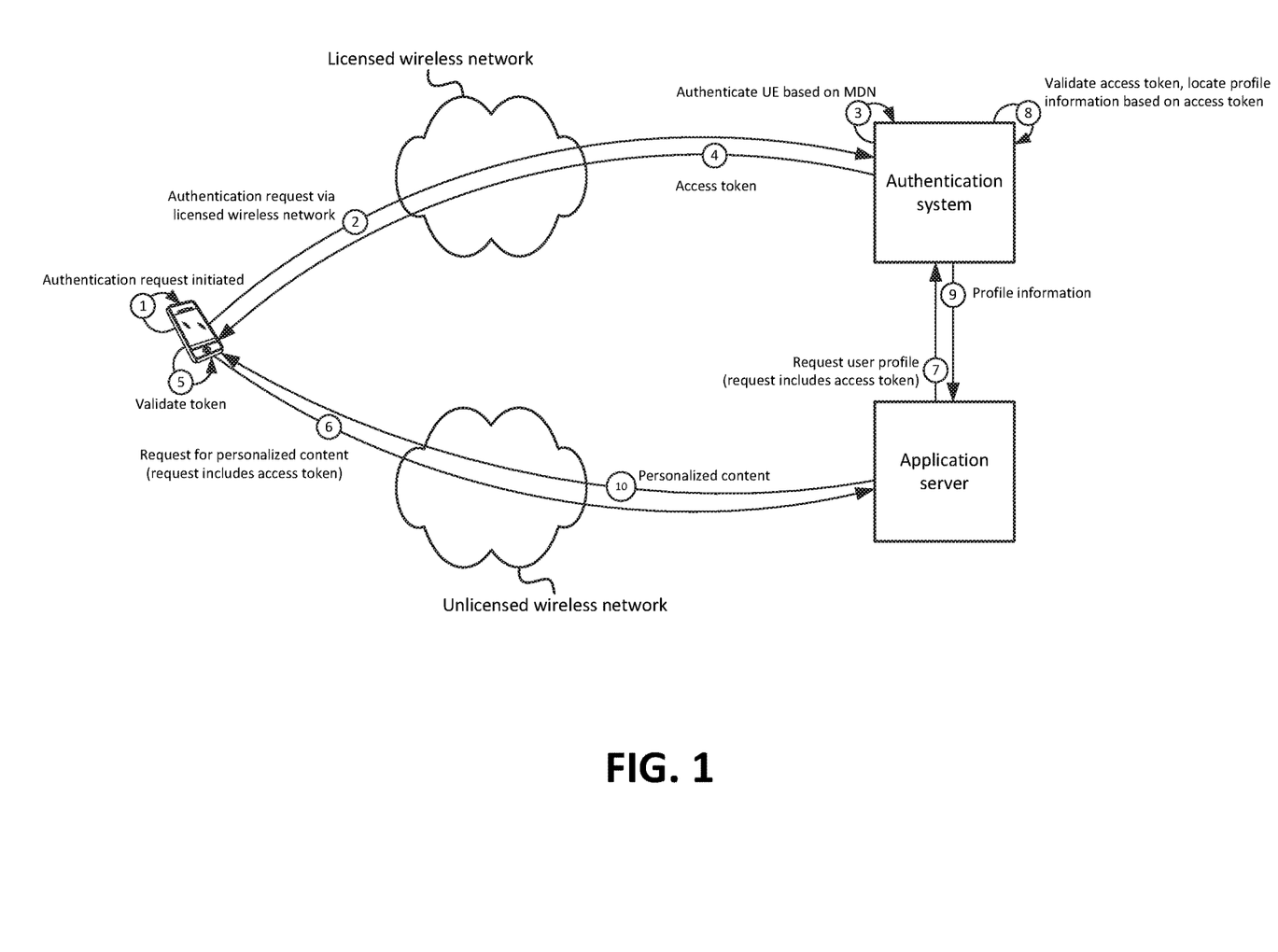
FIG. 1 illustrates an example overview of one or more embodiments described herein.

As shown in FIG. 1, a login request may be initiated (at arrow 1) at a UE. For instance, a user may click a "login" button on a web page or within an application running on the UE. As described below, some embodiments may provide a component (e.g., an "authorization client," which may, in some embodiments, be or include a software component) that detects the login request, and facilitates a network-based authentication procedure (e.g., without requiring the user to provide additional details, such as a username and/or password). The UE (e.g., the authorization client) may establish (at arrow 2) communications with an authentication system, via a licensed wireless network (e.g., an LTE network). That is, even when the UE is actively engaged in communications via, or is connected to, an unlicensed wireless network (e.g., a WiFi network), the UE may communicate with the authentication system via a licensed network, to perform an authentication procedure.

The authentication system may authenticate (at arrow 3) the UE using network-based authentication techniques (i.e., without requiring the user to provide login details, such as a username and/or password). For example, the authentication system may identify the UE by virtue of the UE's connection to the licensed wireless network, and/or may receive information from the wireless network indicating an identity of the UE (e.g., an MDN of the UE and/or some other identifier). Based on authenticating the UE, the authentication system may provide (at arrow 4) an access token to the UE. The UE (e.g., the authorization client) may validate (at arrow 5) the access token, in order to confirm that the access token has been provided by a trusted source (i.e., the authentication system). The authorization client may, once the access token is validated, notify the application from which the login request was initially received that the user has been authenticated. In some embodiments, the authorization client may pass the access token, or information extracted/derived from the access token, to the application.

The UE may subsequently output (at arrow 6) a request for personalized content. For example, once the application has been notified that the user is authenticated, the application may request content, tailored to the user, from an application server. For instance, assume that the application is a banking application. The application server may be a server, associated with the bank, that securely stores and provides banking information to bank customers. The personalized content may include, for example, an account overview for the user, a transaction history for the user, etc. The request for personalized content may include the access token that was previously provided by the authentication system.

Once the application server receives the request for personalized content, the application server may request (at arrow 7) a user profile associated with the access token. The user profile may include, for instance, identifying information associated with the user, such as the user's name, address, telephone number, etc. The authentication system may validate (at arrow 8) the access token, which may entail comparing the access token to the access token previously provided to the UE (and/or some other form of validation). Once the access token is validated, the authentication system may identify the user and/or the UE associated with the access token, and retrieve a user profile associated with the identified user and/or UE, and provide (at arrow 9) the user profile to the application server. The application server may generate the requested personalized content (e.g., may identify an account associated with the user identified in the profile and generate a web page and/or other content associated with the identified account), and provide (at arrow 10) the personalized content to the UE.

Figure 2:
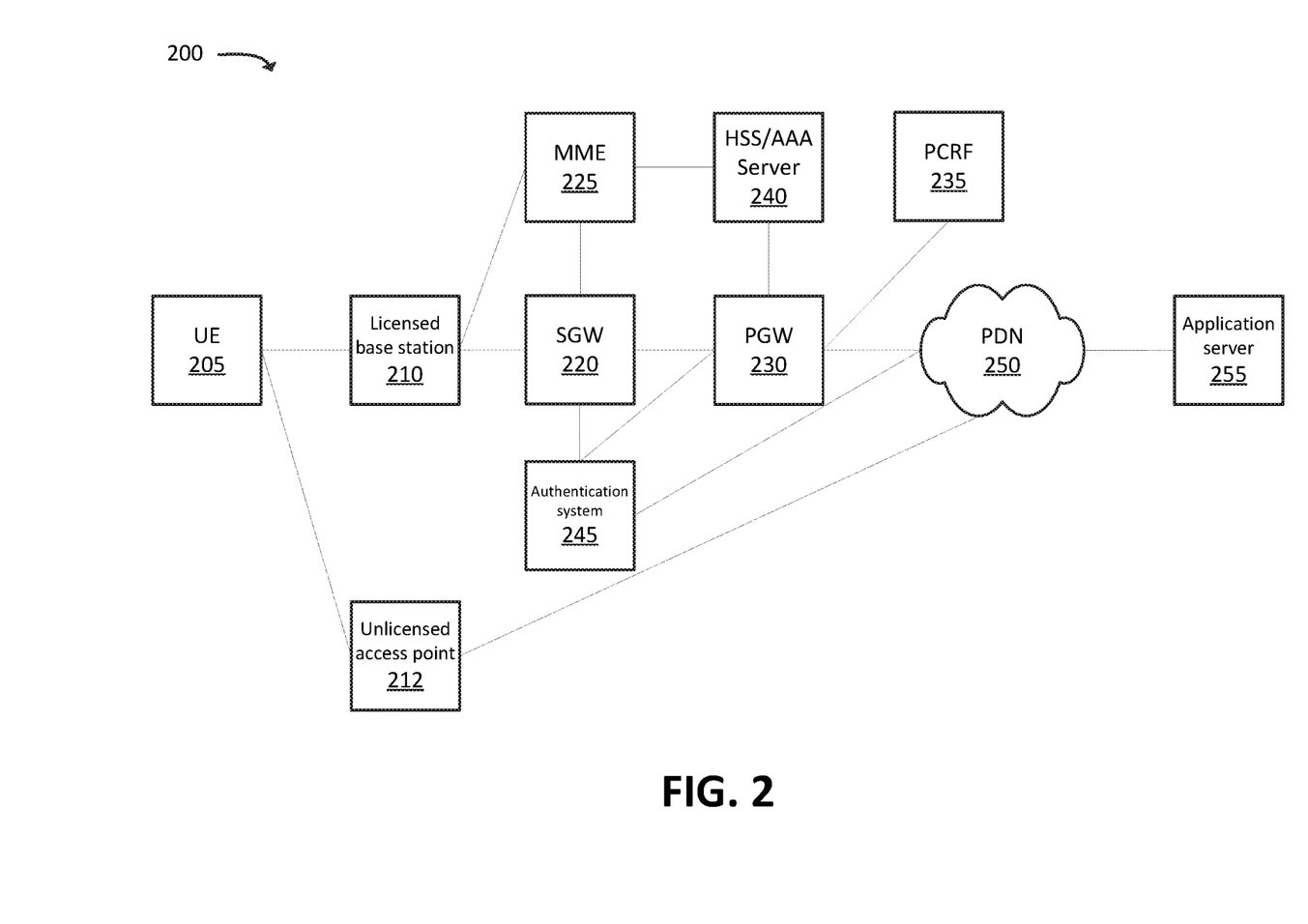
FIG. 2 illustrates an example environment in which systems and/or methods, described herein, may be implemented.

FIG. 2 illustrates example environment 200, in which systems and/or methods described herein may be implemented. As shown in FIG. 2, environment 200 may include UE 205, licensed base station 210, unlicensed access point 212, serving gateway ("SGW") 220, mobility management entity device ("MME") 225, packet data network ("PDN") gateway ("PGW") 230, policy and charging rules function ("PCRF") 235, home subscriber server ("HSS")/authentication, authorization, accounting ("AAA") server 240 (hereinafter referred to as "HSS/AAA server 240"), authentication system 245, PDN 250, and application server 255. While "direct" connections are shown in FIG. 2 between certain devices, some devices may communicate with each other via one or more intermediary devices (e.g., routers, switch, hubs, etc.) or networks (e.g., an Ethernet backhaul network ("EBH") and/or some other type of network). Furthermore, some of the connections shown in FIG. 2 may be logical connections, and may represent the communication between different logical portions of a single hardware device. Further, in some implementations, some devices, shown in FIG. 2, may communicate with each other even though connections are not shown between such devices in the figure.

Environment 200 may include an evolved packet system ("EPS") that includes a Third 3GPP radio access network ("RAN") and/or an Evolved Packet Core ("EPC") network that is operated based on a 3GPP wireless communication standard. The RAN may be, or may include, an LTE network, a 3GPP Fifth Generation ("5G") RAN, etc., that each include one or more licensed base stations 210 (which may take the form of evolved NodeBs ("eNBs")), via which UE 205 may communicate with the EPC network. The EPC network may include one or more SGWs 220, MMES 225, and/or PGWs 230, and may enable UE 205 to communicate with PDN 250 and/or an Internet protocol ("IP") multimedia subsystem ("IMS") core network (not shown). The IMS core network may include and/or communicate with HSS/AAA server 240, and may manage authentication, session initiation, account information, a user profile, etc., associated with UE 205). Environment 200 may also include one or more unlicensed RANs, such as a wireless local area network ("WLAN"), such as a WiFi (e.g., which operates based on an Institute of Electrical and Electronics Engineers ("IEEE") 802.11-based standard) network.

UE 205 may include a computation and communication device, such as a wireless mobile communication device that is capable of communicating with licensed base station 210, and/or PDN 250. UE 205 may be, or may include, a radiotelephone; a personal communications system ("PCS") terminal (e.g., a device that combines a cellular radiotelephone with data processing and data communications capabilities); a personal digital assistant ("PDA") (e.g., a device that may include a radiotelephone, a pager, Internet/intranet access, etc.); a smart phone; a laptop computer; a tablet computer; a camera; a personal gaming system; or another type of mobile computation and communication device. UE 205 may send traffic to and/or receive traffic from PDN 250 via licensed base station 210, SGW 220, and/or PGW 230.

Licensed base station 210 may include one or more network devices that receive, process, and/or transmit traffic, such as calls, audio, video, text, and/or other data, destined for and/or received from UE 205. In one example, licensed base station 210 may be part of an LTE network, a 5G network, etc. To this end, licensed base station 210 may include one or more radio transceivers and/or other radio equipment and/or controllers that operate at one or more licensed frequency bands. Licensed base station 210 may receive traffic, destined for UE 205, from SGW 220, PGW 230, and/or PDN 250, and may output the traffic to UE 205. Licensed base station 210 may also receive traffic from UE 205, and may output the traffic to its intended destination via SGW 220, PGW 230, and/or PDN 250.

Unlicensed access point 212 may include one or more network devices that receive, process, and/or transmit traffic destined for and/or received from UE 205. In one example, unlicensed access point 212 may be part of a WLAN. Unlicensed access point 212 may implement a WiFi network and/or some other type of RAN that is associated with unlicensed portions of the RF spectrum. To this end, unlicensed access point 212 may include one or more radio transceivers and/or other radio equipment and/or controllers that operate at one or more unlicensed frequency bands. Unlicensed access point 212 may receive traffic, destined for UE 205, and/or PDN 250, and may output the traffic to UE 205. Licensed base station 210 may also receive traffic from UE 205, and may output the traffic to its intended destination via PDN 250. In some embodiments, unlicensed access point 212 may include, or may be communicatively coupled with, one or more modems, gateways, and/or other devices via which unlicensed access point 212 can communicate with PDN 250.

SGW 220 may include one or more network devices that gather, process, search, store, and/or provide information in a manner described herein. SGW 220 may, for example, aggregate traffic received from one or more base stations 210, and may send the aggregated traffic to PDN 250 via PGW 230.

MME 225 may include one or more computation and communication devices that perform operations to register UE 205 with the EPS, to establish bearer channels associated with a session with UE 205, to hand off UE 205 from the EPS to another network, to hand off UE 205 from the other network to the EPS, and/or to perform other operations. MME 225 may perform policing operations on traffic destined for and/or received from UE 205.

PGW 230 may include one or more network devices that gather, process, search, store, and/or provide information in a manner described herein. PGW 230 may aggregate traffic received from one or more SGWs 220, etc. and may send the aggregated traffic to PDN 250. PGW 230 may also, or alternatively, receive traffic from PDN 250 and may send the traffic toward UE 205 via licensed base station 210 and/or SGW 220.

PCRF 235 may include one or more devices that aggregate information to and from the EPC network and/or other sources. PCRF 235 may receive information regarding policies and/or subscriptions from one or more sources, such as subscriber databases and/or from one or more users (such as, for example, an administrator associated with PCRF 235).

HSS/AAA server 240 may include one or more devices that manage, update, and/or store, in a memory associated with HSS/AAA server 240, profile information associated with a subscriber. HSS/AAA server 240 may perform authentication, authorization, and/or accounting operations associated with the subscriber and/or a communication session with UE 205.

Authentication system 245 may include one or more devices (e.g., a server device and/or a collection of server devices, such as a "cloud" system) that perform one or more operations described herein. For instance, as described below, authentication system 245 may aid in the frictionless authentication of UE 205, including in situations where UE 205 is actively communicating via and/or is connected to unlicensed access point 212 (e.g., situations in which UE 205 is not actively communicating via and/or is not connected to licensed base station 210).

PDN 250 may include one or more wired and/or wireless networks. For example, PDN 250 may include an IP-based PDN, a wide area network ("WAN") such as the Internet, a private enterprise network, and/or one or more other networks. UE 205 may connect, through PGW 230, to data servers, application servers, other UEs 205, and/or to other servers or applications that are coupled to PDN 250. PDN 250 may be connected to one or more other networks, such as a public switched telephone network ("PSTN"), a public land mobile network ("PLMN"), and/or another network. PDN 250 may be connected to one or more devices, such as content providers, applications, web servers, and/or other devices, with which UE 205 may communicate.

Application server 255 may include one or more devices (e.g., a server device and/or a collection of server devices, such as a "cloud" system) that communicate with UE 205 in order to provide services to UE 205. For example, application server 255 may implement a video streaming service, a web site, a gaming server, and/or some other type of application or service. In some embodiments, application server 255 may communicate with a client that is executed by UE 205.

Figure 3:
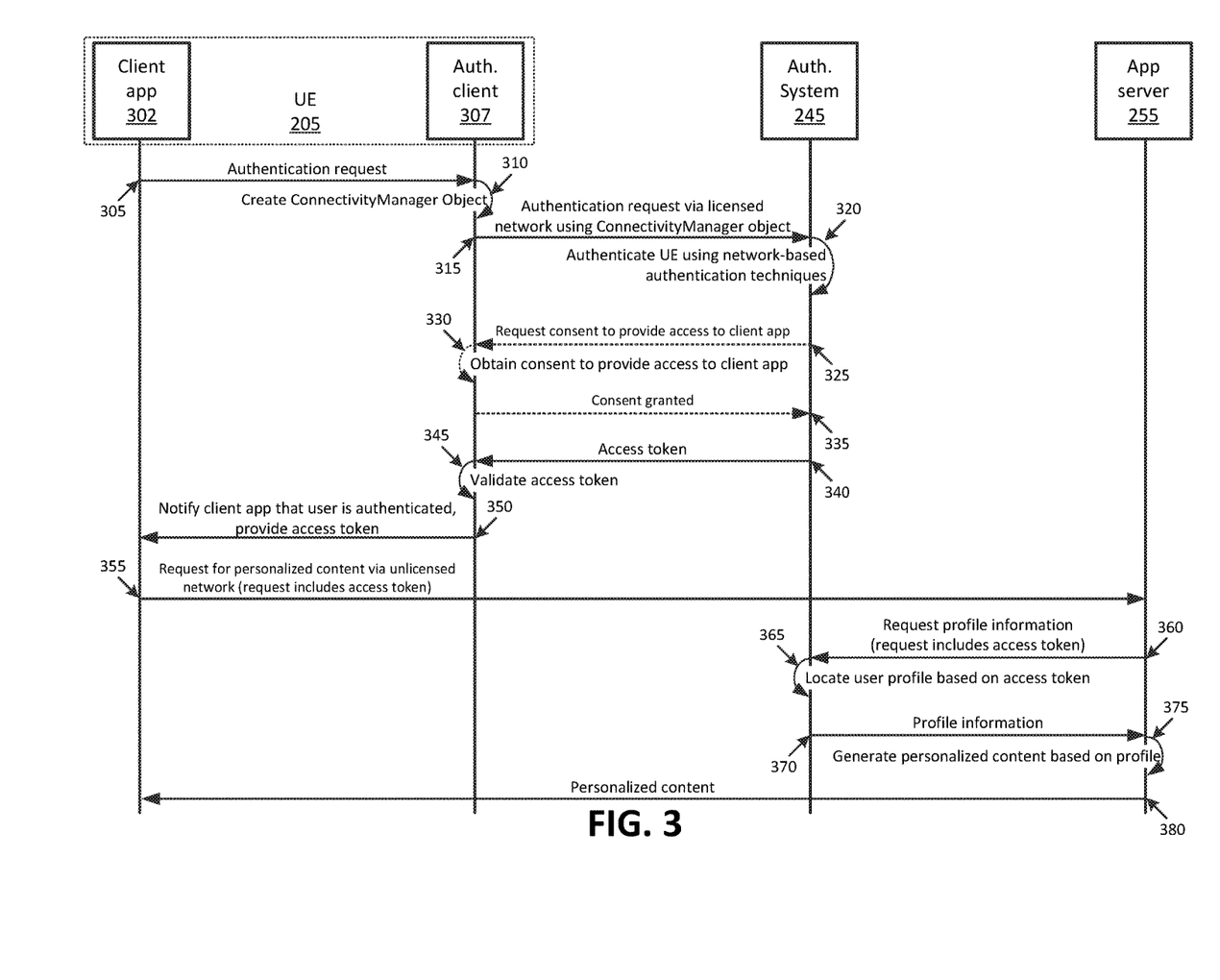
FIG. 3 illustrates an example signal flow of one or more embodiments in which a ConnectivityManager object may be used to establish communications between a device and an authentication system.

FIG. 3 illustrates an example process for performing frictionless authentication, using tools provided by an operating system of UE 205. For example, certain operating systems provide an authorization client that allows applications to select particular network interfaces, and establish communications using the particular network interfaces. For example, an Android® operating system may provide an API, including a ConnectivityManager class, which allows particular network interfaces to be selected for communications.

As shown in FIG. 3, a client application ("app") 302, running on UE 205, may initiate (at 305) an authentication request. For instance, client application 302 may receive a selection, from a user, to access content provided by client application 302. For example, if client application 302 is a banking application, the user may wish to view his or her transaction history, bank balance, etc. As another example, if client application 302 is a video streaming service, the user may wish to view a library of available titles, begin streaming a particular video content item, etc.

The application may be configured to communicate with authorization client 307, which may also be installed on UE 205. Generally speaking, from the standpoint of client application 302, authorization client 307 may be the authentication endpoint. In other words, client application 302 may request authentication of the user to authorization client 307, and may accept, or "trust," the response of authorization client 307 (e.g., a denial or approval of the authentication request). In this sense, authorization client 307 may include, or implement, a proxy (e.g., an IP proxy, such as an HAProxy). For instance, the request from client application 302 may be made as an HTTP request to a particular URL or IP address (and, in some embodiments, port number), and authorization client 307 may be configured to intercept requests made to a particular URL and/or IP address/port number.

That is, in some embodiments, client application 302 may not be "aware" of authentication client 307, in that client application 302 may not make a specific call to authentication client 307. Instead, in such embodiments, authentication client 307 may be configured recognize and intercept authentication requests (e.g., by detecting that a URL of outgoing HTTP request matches a URL associated with a particular application server 255, or that the URL of an outgoing HTTP request includes a string indicating that the URL is associated with an authentication request). In other embodiments, client application 302 may be configured to directly communicate with authentication client 307 (e.g., via an API associated with authentication client 307) in order to perform the authentication process described herein.

authorization client 307 may handle the authentication request by communicating, via a licensed wireless network (e.g., as opposed to an unlicensed wireless network), with authentication system 245, in order to allow authentication system 245 to perform network-based authentication techniques to authenticate UE 205. For instance, based on the request from client application 302, authorization client 307 may create, or instantiate (at 310), a ConnectivityManager object. As described below (i.e., with reference to FIGS. 4A and 4B), authorization client 307 may use the ConnectivityManager object to communicate with authentication system 245 over the licensed wireless network. For instance, in some embodiments, authorization client 307 may use the ConnectivityManager object to set a "default," or "active," network interface, of UE 205, to a network interface associated with the licensed wireless network. In other embodiments, authorization client 307 may use the ConnectivityManager object to establish a traffic flow between UE 205 and authentication system 245, via the licensed wireless network, without changing the "default," or "active," network interface of UE 205.

In some embodiments, before creating a ConnectivityManager object to communicate with authentication system 245, authorization client 307 may first determine which network interface(s) on UE 205 have active connections. For example, if UE 205 has an active connection to the licensed wireless network (and/or the "default" network interface of UE 205 is an interface to the licensed wireless network), and does not have an active connection to an unlicensed wireless network, then UE 205 may forgo creating a ConnectivityManager object, and may simply use the existing connection with the licensed wireless network to communicate with authentication system 245. As another example, authorization client 307 may create the ConnectivityManager object only in situations where UE 205 has an active connection with an unlicensed wireless network. In some embodiments, authorization client 307 may create the ConnectivityManager object regardless of which network interfaces, of UE 205, are currently active.

authorization client 307 may output (at 315) an authentication request, via the licensed wireless network (e.g., using the ConnectivityManager object), to authentication system 245. Authentication system 245 may authenticate (at 320) UE 205 using network-based authentication techniques. For example, in some embodiments, authentication system 245 may receive information, from the licensed wireless network, indicating an identity of UE 205. The identifying information may include, for instance, an MDN of UE 205, a value derived from the MDN of UE 205, an International Mobile Equipment Identity ("IMEI") value, an International Mobile Subscriber Identity ("IMSI") value, and/or some other identifier of UE 205.

Additionally, or alternatively, the authentication request may include some or all of the following information: a client identifier (e.g., an identifier associated with client application 302 and/or application server 255), a client secret (e.g., further security-related information associated with client application 302 and/or application server 255), a desired response type (e.g., a request to provide a code), scope (e.g., the types of information requested, such as an OpenID profile, name of the user, gender, an image of the user, an email address, a physical address, date of birth, etc.), a redirect URI associated with application server 255, and/or a state (e.g., a pseudorandom string of potentially variable length).

In some embodiments, authentication system 245 may request (at 325) consent to provide access to client application 302. In other words, authentication system 245 may request the user's consent to authenticate the user, using network-based authentication techniques, for client app 302 (e.g., in lieu of a separate authentication process implemented by client application 302, such as a user name and password combination associated with authentication client 307 and/or application server 255). In some embodiments, authentication system 245 may forgo requesting consent, such as in situations where the user has previously provided consent for authentication system 245 to authenticate the user in coordination with client application 302. In these situations, authentication system 245 may have previously stored information, indicating that consent has already been received from UE 205 for authentication system 245 to authenticate the user in coordination with client application 302. In some embodiments, authentication system 245 may store such information on a per-application basis. That is, even if consent has been received for the user to be authenticated for one client application (in coordination with authentication system 245), this may not necessarily indicate that the user has provided consent for another client application to receive authentication information from authentication system 245. The dashed lines in FIG. 3 reflect that the consent may only need to be obtained in certain situations (e.g., if consent has not been previously obtained).

After consent is requested, authentication client 307 may obtain (at 330) consent to provide access to client application 302. For example, authentication client 307 may cause a prompt (e.g., an audio prompt, a graphical prompt, etc.) to be presented by UE 205, via which the user of UE 205 can grant or deny consent. Assuming that consent has been granted (at 335), authentication system 245 may provide (at 340) an access token to authentication client 307. The access token may be a cookie, an OpenID token, and/or may take some other suitable form. Authentication system 245 may also store the access token for future operations (e.g., as described below with respect to arrows 360-370). The access token may include, or be accompanied by, some or all of the following information: the client identifier, an access code, the scope, the redirect URI, the client secret, and/or a lifetime of the access token (e.g., as expressed in terms of an expiration date or time, or as a duration from a reference time).

Authentication client 307 may validate (at 345) the received access token. For instance, authentication client 307 may verify that a cryptographic algorithm associated with the access token matches a cryptographic algorithm that has been previously registered with authentication client 307, verifying the client secret and/or client identifier provided in the response, and/or validating a signature or hash message authentication code ("HMAC") of the access token. Authentication client 307 may also verify other information associated with, or contained in, the access token. For instance, authentication client 307 may verify whether the access token has expired (e.g., by checking a timestamp that the access token was generated or issued), whether the access token was intended to be sent to authentication client 307 (e.g., may check an "audience" of the access token), whether an issuer of the access token matches an expected issuer (i.e., authentication system 245, in this example), and/or whether the access token includes an expected nonce (e.g., a random or pseudorandom string that may have been included in the authentication request sent at 315).

Once the received access token has been validated, authentication client 307 may notify (at 350) client application 302 that the user (and/or UE 205) has been authenticated. In other words, this notification may indicate that the user (and/or UE 205) has been authenticated using network-based authentication techniques. Authentication client 307 may also pass the access token to client application 302.

In some embodiments, once client application 302 has been notified that the user has been authenticated, client application 302 may be configured to request and present personalized content for the user. For instance, if client application 302 is a banking application, the personalized content may include an account overview, transaction history, etc. In order to present the personalized content, client application 302 may first request (at 355) the personalized content from application server 255. For example, application server 255 may be a communication endpoint and interface for a database of a bank that is associated with client application 302. The request may include the access token previously obtained by authentication client 307 from authentication system 245. In some embodiments, the request may include an address (e.g., an IP address, an IP address and port number, a Uniform Resource Locator ("URL"), a Uniform Resource Identifier ("URI"), etc.) associated with authentication system 245.

In some embodiments, the request may be made over an unlicensed wireless network (e.g., a WiFi network). For example, in some embodiments, after authentication client 307 receives the access token (at 340) and/or validates the access token (at 345), authentication client 307 may change the "default," or "active" network interface, of UE 205, to a network interface associated with the unlicensed wireless network.

Once application server 255 receives the request for personalized content, application server 255 may request (at 360) profile information for the user (and/or for UE 205). This request may include the access token provided by client application 302 (at 355). Authentication system 245 may locate a user profile, based on the received access token. For instance, authentication system 245 may include, or be communicatively coupled with, a repository that stores information regarding several users. Authentication system 245 may identify the user, associated with the request, based on comparing the access token received from application server 255 (at 360) with the access token previously provided to authentication client 307 (at 340). The profile information may include, for instance, a name of the user, a telephone number of the user, and/or other information associated with the user. Once authentication system 245 has located the profile information, authentication system 245 may provide (at 370) the profile information to application server 255.

Application server 255 may generate (at 375) personalized content based on the received profile information. For example, application server 255 may identify further information, stored by application server 255 (and/or by a repository communicatively coupled to, and accessible by, application server 255). Continuing with the above example, the user profile information may include the name of a banking customer (i.e., the user), and the further information stored by application server 255 may include the banking customer's bank account information. The generated customized content may be, or include, information relevant to the request from client application 302 (at 355). For example, if the request was for transaction information during a particular date range, the customized content may be information regarding transactions, by the banking customer, during the particular date range. Application server 255 may provide (at 380) the requested personalized content to client application 302. Client application 302 may present the personalized content via a display device, an audio output device, etc. of UE 205.

Figure 4A:
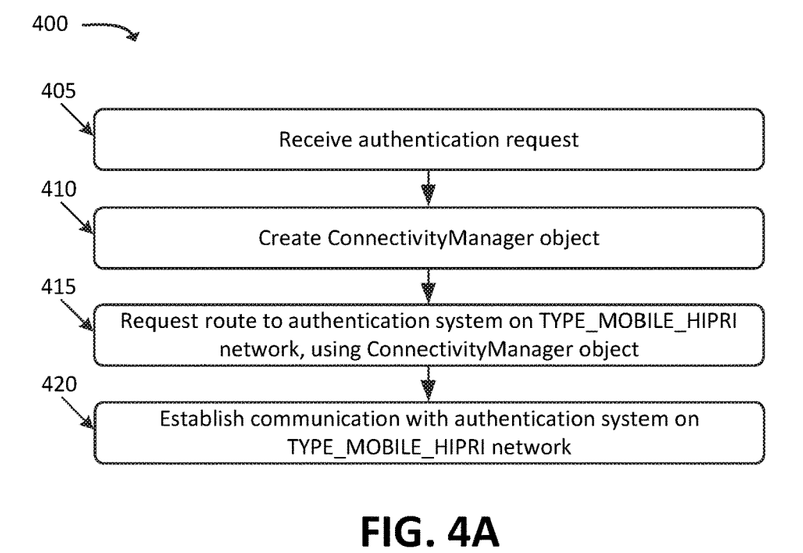
FIGS. 4A and 4B illustrate example processes of establishing communications between a device and an authentication system using a ConnectivityManager object.
Figure 4B:
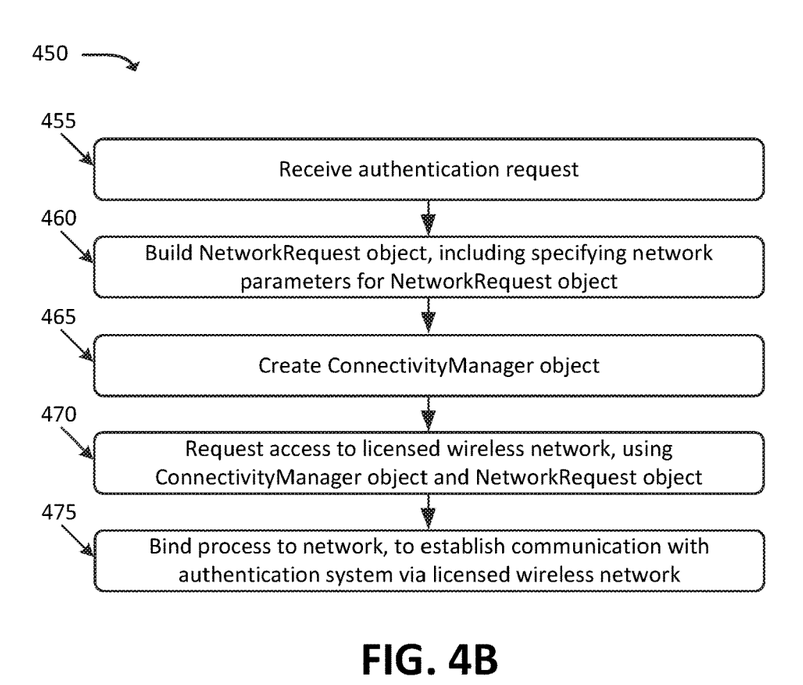

FIGS. 4A and 4B illustrate example processes 400 and 450, respectively, which may each correspond to embodiments that relate to using a ConnectivityManager object to establish communications between UE 205 and authentication system 245 via an unlicensed wireless network. As mentioned above, the use of the ConnectivityManager class may allow UE 205 (e.g., authorization client 307) to select a particular network interface, of UE 205, for communications with authentication system 245, which may be different than a currently active network interface (e.g., a WiFi interface). Using the unlicensed wireless network to communicate with authentication system 245 may allow authentication system 245 to authenticate UE 205 using network-based techniques. Processes 400 and 450 may, in some embodiments, be performed by UE 205 (e.g., by authorization client 307).

As shown in FIG. 4A, process 400 may include receiving (at 405) an authentication request. For instance, authorization client 307 may receive a login request from a client application running on UE 205, which is configured to communicate with authorization client 307. Additionally, or alternatively, authorization client 307 may itself provide an option (e.g., a selectable graphical element, such as a button) to perform a network-based authentication process.

Process 400 may also include creating (at 410) a ConnectivityManager object. For example, UE 205 may include an implementation of a ConnectivityManager class (e.g., android.net.ConnectivityManager), of which UE 205 may create an instantiation.

In some embodiments, prior to creating the ConnectivityManager object, UE 205 may determine an "active," or "default," network interface associated with UE 205. For instance, UE 205 may create the ConnectivityManager object only under certain conditions, such as when UE 205 does not have an active connection via the licensed wireless network, or when a connection via the licensed wireless network is not associated with a "default" or "active" network interface of UE 205. As another example, UE 205 may create the ConnectivityManager object in situations where a network interface to an unlicensed wireless network (e.g., a WiFi network) is active.

In some embodiments, UE 205 may forgo creating the ConnectivityManager object when the "default" or "active" network interface is connected to the licensed wireless network. In other embodiments, UE 205 may create the ConnectivityManager object regardless of which network interface(s) of UE 205 are active at the time the login request is received.

Process 400 may additionally include requesting (at 415) a route to authentication system 245, using the ConnectivityManager object. The request may include specifying that a network type, for the ConnectivityManager object, is a TYPE_MOBILE_HIPRI network (e.g., a licensed wireless network, such as a cellular network). The request may also include specifying a destination address, such as a URL, URI, IP address, etc. associated with authentication system 245. In some embodiments, the route may be requested by invoking the startUsingNetworkFeature method of the ConnectivityManagerObject class, and passing ConnectivityManager.TYPE_MOBILE and "enableHIPRI" as parameters to the startUsingNetworkFeature method; and by invoking the requestRouteToHost method of the ConnectivityManager class, and passing ConnectivityManager.TYPE_MOBILE_HIPRI and an address of authentication system 245 as parameters to the requestRouteToHost method.

Process 400 may further include establishing (at 420) communication with authentication system 245 on the licensed wireless network, using the ConnectivityManager object. Once a route has been established between UE 205 and authentication system 245, UE 205 may output an authentication request (e.g., as mentioned above with respect to arrow 315) to authentication system 245 via the licensed wireless network.

In the process shown in FIG. 4B, the ConnectivityManager class may be a different version than described above with respect to FIG. 4A. For instance, the ConnectivityManager class described with respect to FIG. 4B may be a newer version, in which TYPE_MOBILE_HIPRI is deprecated, and other tools are provided for specifying a network over which to communicate.

As shown in FIG. 4B, process 450 may include receiving (at 455) an authentication request, and building (at 460) a NetworkRequest object to connect to a network with an Internet capability, and a cellular and/or licensed wireless network type. The NetworkRequest object may be created in order to obtain access to a network interface, of UE 205, that is associated with the licensed wireless network. For example, a NetworkRequest object may be instantiated, and one or more methods of the NetworkRequest.Builder class may be used to set the capability and transport type for the NetworkRequest object. For instance, the NetworkRequest.Builder.addCapability method, with a parameter of NetworkCapabilities.NET_CAPABILITY_INTERNET; and the NetworkRequest.Builder.addTransportType method, with a parameter of NetworkCapabilities.TRANSPORT_CELLULAR, may be used to specify the capability and transport type of the NetworkRequest object.

Once the NetworkRequest object is built with the specified capability and transport type, process 400 may further include creating, or instantiating (at 465), a ConnectivityManager object, and requesting (at 470) access to the licensed wireless network, using the ConnectivityManager object and the NetworkRequest object. For example, the requestNetwork method of the ConnectivityManager class may be used, with the NetworkRequest object (built at 465) being passed as a parameter for the requestNetwork method.

Process 400 may further include binding a process, associated with the ConnectivityManager object, to the licensed wireless network. For example, the bindProcessToNetwork method of the ConnectivityManager class may be used on the ConnectivityManager object, with the requested network (i.e., the licensed wireless network) as a parameter, to bind the ConnectivityManager process to the licensed wireless network. Once the process is bound to the licensed wireless network, UE 205 may communicate with authentication system 245 via the licensed wireless network, in order to perform a frictionless authentication process as described above.

Figure 5:
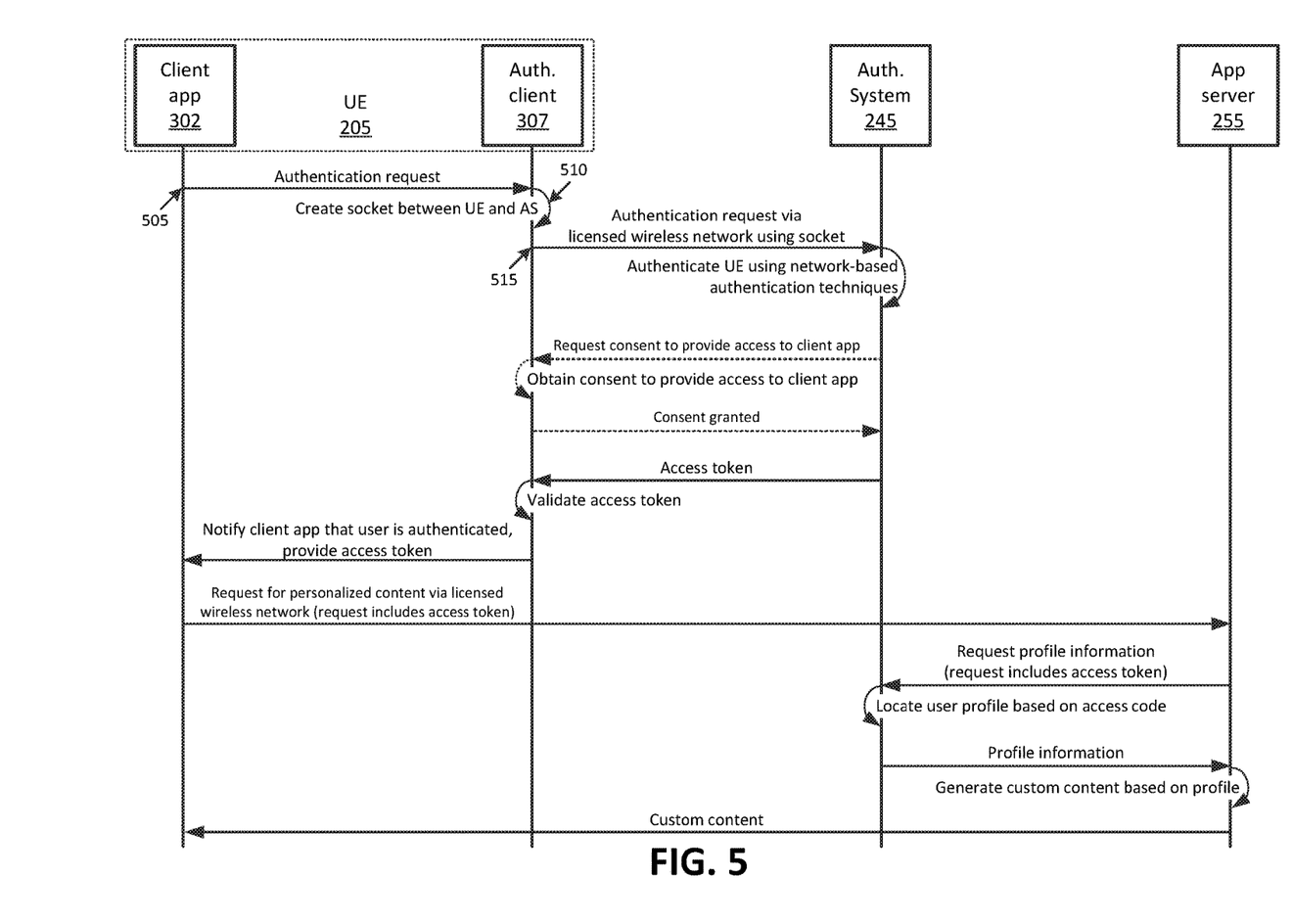
FIG. 5 illustrates an example signal flow of one or more embodiments in which a socket is used to establish communication between a device and an authentication system.

FIG. 5 illustrates another example authentication process, in which a socket is used to communicate with authentication system 245. For instance, this process may be used when UE 205 does not include an implementation of a ConnectivityManager class. In some embodiments, this process may be used even when UE 205 includes an implementation of a ConnectivityManager class. Several of the operations shown in FIG. 5 are similar to those discussed above with respect to FIG. 3, and are not described again below, for the sake of brevity.

Figure 6:
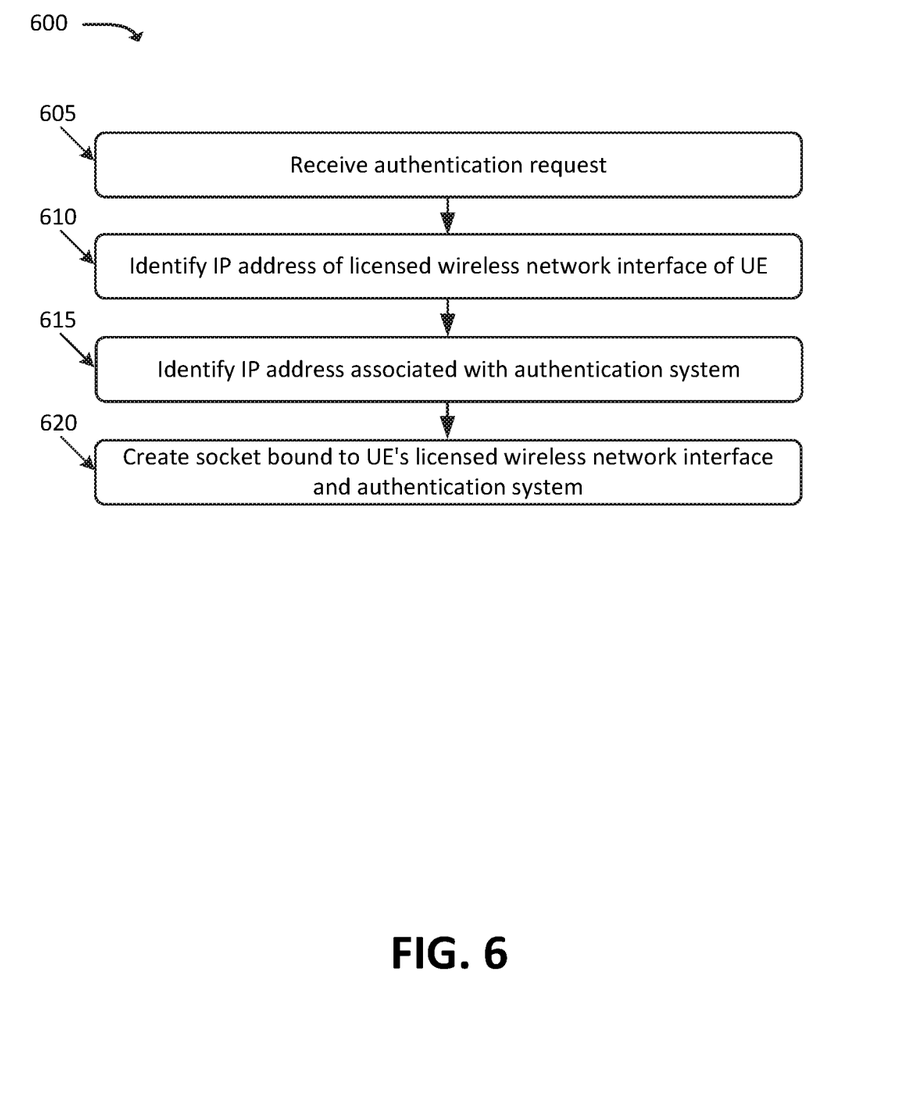
FIG. 6 illustrates an example process of establishing communications between a device and an authentication system using a socket.

As shown, authentication client 307 may receive (at 505) an authentication request (e.g., from client application 302). Authentication client 307 may create (at 510) a socket between UE 205 and authentication system 245. FIG. 6, described below, illustrates an example process for creating the socket. Generally speaking, the socket may be created so that UE 205 can communicate with authentication system 245 via an unlicensed wireless network (e.g., as opposed to via a licensed wireless network). Authentication client 307 may output (at 515) an authentication request to authentication system 245, via the socket (e.g., via the licensed wireless network). The remaining operations, shown in FIG. 5, are similar to corresponding operations shown in FIG. 3.

FIG. 6 illustrates an example process 600, which may correspond to the creation of a socket between UE 205 and authentication system 245. More specifically, the socket may be bound to a network interface, of UE 205, that is associated with a licensed wireless network. Process 600 may, in some embodiments, be performed by UE 205.

As shown, process 600 may include receiving (at 605) an authentication request (e.g., as similarly described above with respect to FIGS. 4A and 4B). Process 600 may also include identifying (at 610) an IP address of a network interface, of UE 205, that is associated with a licensed wireless network. For instance, authentication client 307 may query an operating system of UE 205 to obtain the IP address of the licensed wireless network interface, and/or obtain the IP address using some other suitable means.

Process 600 may further include identifying (at 615) an IP address associated with authentication system 245. In some embodiments, authentication client 307 may be pre-configured with the IP address of authentication system 245.

Process 600 may additionally include creating (at 620) a socket, between UE 205 and authentication system 245. More specifically, the socket may be bound to the licensed wireless network interface of UE 205 (i.e., using the IP address of the licensed wireless network interface) and to authentication system 245. UE 205 (e.g., authorization client 307) may use this socket for subsequent communications (e.g., for sending an authentication request to authentication system 245 and receiving a response from authentication system 245). The request may be sent, for instance, using an HTTP GET request, a secure HTTP ("HTTPS") GET request, or through some other suitable signaling.

Figure 7:
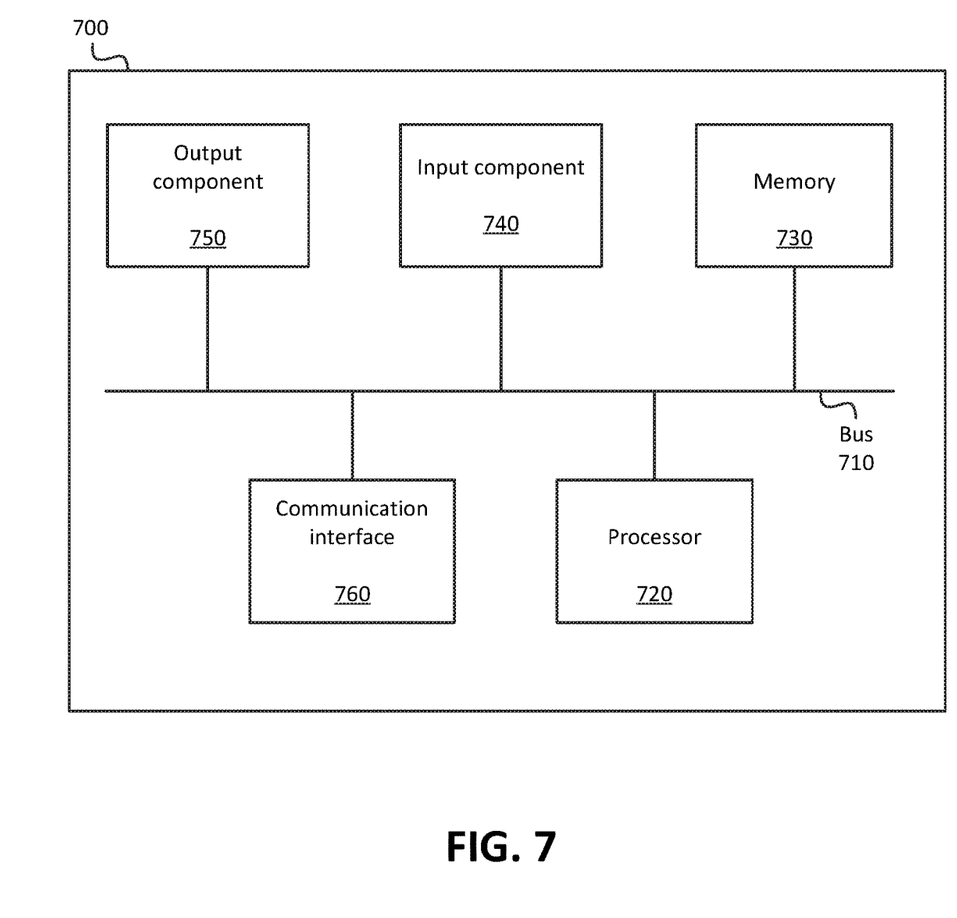
FIG. 7 illustrates example components of one or more devices, according to one or more implementations described herein.

FIG. 7 illustrates example components of device 700. One or more of the devices described above may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of signals have been described with regard to FIGS. 1-3, the order of the signals may be modified in other implementations. Further, non-dependent signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
    a non-transitory computer-readable medium storing a set of processor-executable instructions; and
    one or more processors configured to execute the set of processor-executable instructions, wherein executing the set of processor-executable instructions causes the one or more processors to:
        determine that the device should be authenticated for a particular application;
        determine, based on the determination that the device should be authenticated, whether the device is connected to a particular licensed wireless network;
        identify that the device is not connected to the particular licensed wireless network;
        establish, based on the identifying that the device is not connected to the particular licensed wireless network, a communication with an authentication system via the particular licensed wireless network;
        output, to the authentication system and via the particular licensed wireless network, an authentication request, wherein the authentication system performs a network-based authentication on the device based on the authentication request outputted via the particular licensed wireless network;
        receive, from the authentication system and in response to the authentication request, an access token that indicates that the authentication system has authenticated the device; and
        provide, to the particular application, the received access token.

2. The device of claim 1, wherein the access token, once provided to the particular application, allows the particular application to obtain secure or personalized content from an application server that is associated with the particular application.

3. The device of claim 2, wherein the particular application provides the access token to the application server,
    wherein the application server uses the access token to obtain user profile information from the authentication server,
    wherein the application server generates the secure or personalized content based on the obtained user profile information.

4. The device of claim 1, wherein the processor-executable instructions, to establish the communication with the authentication system, via the particular licensed wireless network, include processor-executable instructions to:
create a ConnectivityManager object; and
use the ConnectivityManager object to establish the communication with the authentication system via the particular licensed wireless network.

5. The device of claim 4, wherein the processor-executable instructions, to use the ConnectivityManager object, include processor-executable instructions to:
request a route to the authentication system on a TYPE_MOBILE_HIPRI network.

6. The device of claim 4, wherein the processor-executable instructions, to use the ConnectivityManager object, include processor-executable instructions to:
build a NetworkRequest object, the building including specifying, for the NetworkRequest object:
a NetworkCapabilities.NET_CAPABILITY_INTERNET capability, and
a NetworkCapabilities.TRANSPORT$_{13}$ CELLULAR transport type; and
invoke a bindProcessToNetwork method, using the ConnectivityManager object and the NetworkRequest object.

7. The device of claim 1, wherein the processor-executable instructions, to establish the communication with the authentication system, via the particular licensed wireless network, include processor-executable instructions to:
determine an address of a particular network interface of the device, the particular network interface being associated with the particular licensed wireless network;
identify an address associated with the authentication system; and
create a socket that is bound to:
the address of the particular network interface that is associated with the particular licensed wireless network, and
the address associated with the authentication system, wherein the communication is established via the created socket.

8. A method, comprising:
determining, by a device, that the device should be authenticated for a particular application;
determining, by the device and based on the determination that the device should be authenticated for the particular application, whether the device is connected to a particular licensed wireless network;
identifying, by the device, that the device is not connected to the particular licensed wireless network;
establishing, by the device and based on identifying that the device is not connected to the particular licensed wireless network, a communication with an authentication system via the particular licensed wireless network;
outputting, by the device, to the authentication system, and via the particular licensed wireless network, an authentication request, wherein the authentication system performs a network-based authentication on the device based on the authentication request outputted via the particular licensed wireless network;
receiving, by the device, from the authentication system and in response to the authentication request, an access token that indicates that the authentication system has authenticated the device; and
providing, to the particular application, the received access token.

9. The method of claim 8, wherein the access token, once provided to the particular application, allows the particular application to obtain secure or personalized content from an application server that is associated with the particular application.

10. The method of claim 9, wherein the particular application provides the access token to the application server,
wherein the application server uses the access token to obtain user profile information from the authentication server,
wherein the application server generates the secure or personalized content based on the obtained user profile information.

11. The method of claim 8, wherein establishing the communication with the authentication system, via the particular licensed wireless network, includes:
creating a ConnectivityManager object; and
using the ConnectivityManager object to establish the communication with the authentication system via the particular licensed wireless network.

12. The method of claim 11, wherein using the ConnectivityManager object includes:
requesting a route to the authentication system on a TYPE_MOBILE_HIPRI network.

13. The method of claim 11, wherein using the ConnectivityManager object includes:
building a NetworkRequest object, the building including specifying, for the NetworkRequest object:
a NetworkCapabilities.NET_CAPABILITY_INTERNET capability, and
a NetworkCapabilities.TRANSPORT_CELLULAR transport type; and
invoking a bindProcessToNetwork method, using the ConnectivityManager object and the NetworkRequest object.

14. The method of claim 8, wherein establishing the communication with the authentication system, via the particular licensed wireless network, includes:
determining an address of a particular network interface of the device, the particular network interface being associated with the particular licensed wireless network;
identifying an address associated with the authentication system; and
creating a socket that is bound to:
the address of the particular network interface that is associated with the particular licensed wireless network, and
the address associated with the authentication system, wherein the communication is established via the created socket.

15. A non-transitory computer-readable medium, storing a set of processor-executable instructions, which, when executed by one or more processors of a device, cause the one or more processors to:
determine that the device should be authenticated for a particular application;
determine, based on the determination that the device should be authenticated, whether the device is connected to a particular licensed wireless network;
identify that the device is not connected to the particular licensed wireless network;
establish, based on the identifying that the device is not connected to the particular licensed wireless network, a communication with an authentication system via the particular licensed wireless network;

output, to the authentication system and via the particular licensed wireless network, an authentication request, wherein the authentication system performs a network-based authentication on the device based on the authentication request outputted via the particular licensed wireless network;

receive, from the authentication system and in response to the authentication request, an access token that indicates that the authentication system has authenticated the device; and provide, to the particular application, the received access token.

16. The non-transitory computer-readable medium of claim 15, wherein the access token, once provided to the particular application, allows the particular application to obtain secure or personalized content from an application server that is associated with the particular application.

17. The non-transitory computer-readable medium of claim 15, wherein the processor-executable instructions, to establish the communication with the authentication system, via the particular licensed wireless network, include processor-executable instructions to:

create a ConnectivityManager object; and use the ConnectivityManager object to establish the communication with the authentication system via the particular licensed wireless network.

18. The non-transitory computer-readable medium of claim 17, wherein the processor-executable instructions, to use the ConnectivityManager object, include processor-executable instructions to:

request a route to the authentication system on a TYPE_MOBILE_HIPRI network.

19. The non-transitory computer-readable medium of claim 17, wherein the processor-executable instructions, to use the ConnectivityManager object, include processor-executable instructions to:

build a NetworkRequest object, the building including specifying, for the NetworkRequest object:
- a NetworkCapabilities.NET_CAPABILITY_INTERNET capability, and
- a NetworkCapabilities.TRANSPORT_CELLULAR transport type; and invoke a bindProcessToNetwork method, using the ConnectivityManager object and the NetworkRequest object.

20. The non-transitory computer-readable medium of claim 15, wherein the processor-executable instructions, to establish the communication with the authentication system, via the particular licensed wireless network, include processor-executable instructions to:

determine an address of a particular network interface of the device, the particular network interface being associated with the particular licensed wireless network;

identify an address associated with the authentication system; and create a socket that is bound to:
- the address of the particular network interface that is associated with the particular licensed wireless network, and
- the address associated with the authentication system, wherein the communication is established via the created socket.

* * * * *